Figure 7:
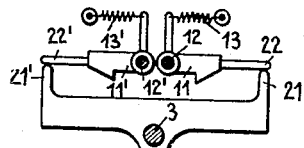

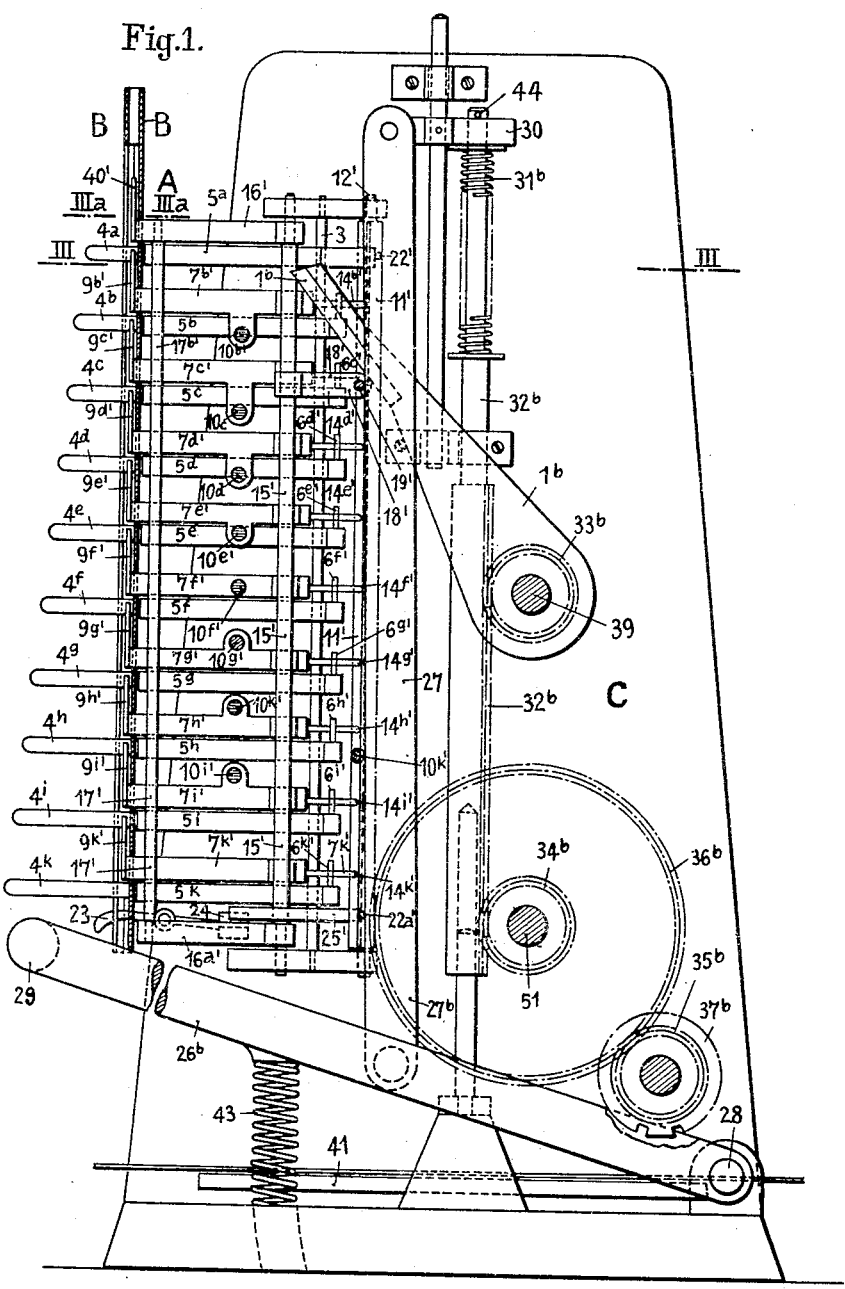

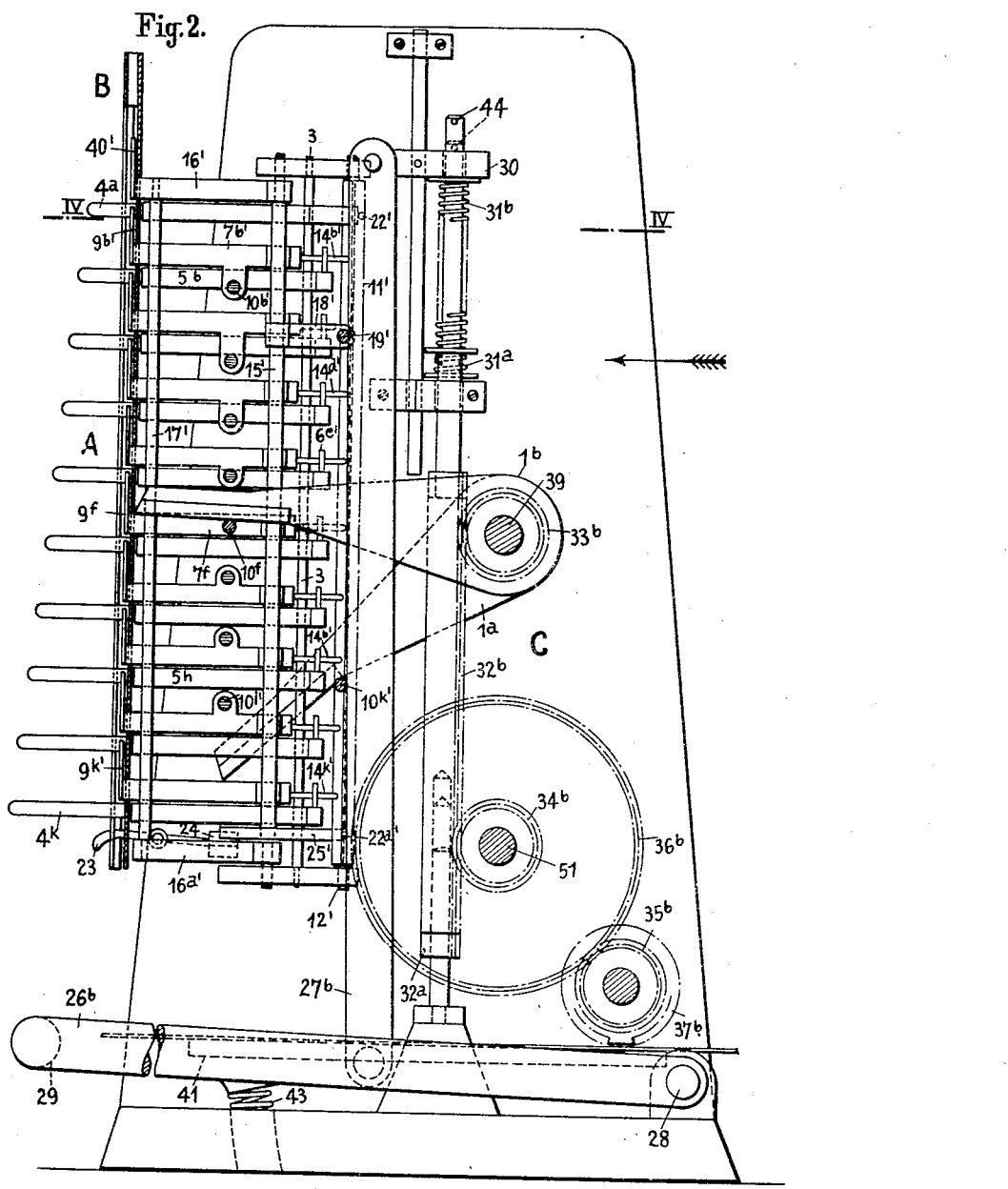

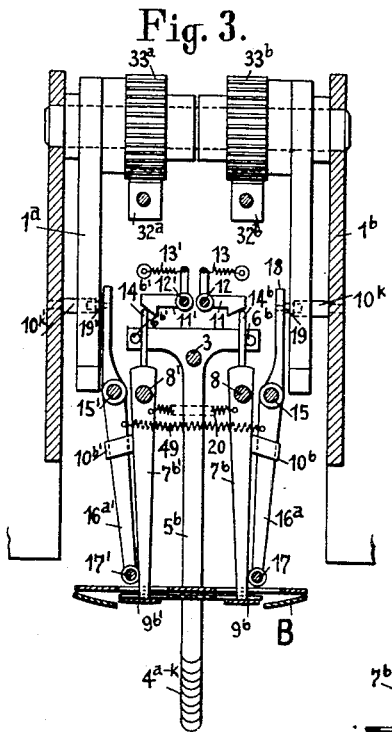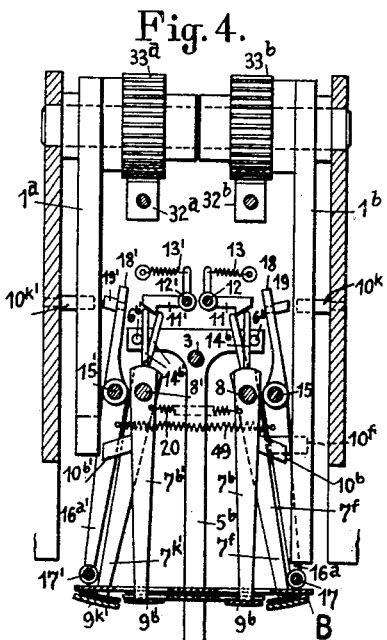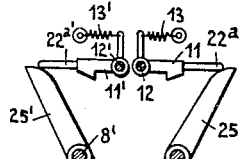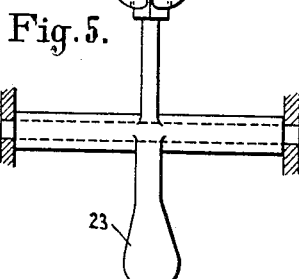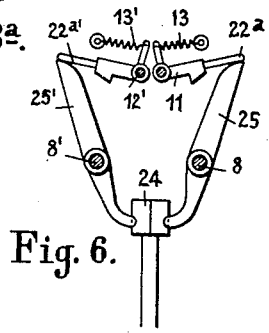

R. SCHMIDT.
INDICATING AND RECORDING MECHANISM.
APPLICATION FILED MAY 1, 1913. RENEWED JUNE 1, 1916.

1,206,035.

Patented Nov. 28, 1916.
5 SHEETS—SHEET 4.

Witnesses:
Inventor
Reinhold Schmidt
atty

UNITED STATES PATENT OFFICE.

REINHOLD SCHMIDT, OF BERLIN, GERMANY, ASSIGNOR TO RICHARD BAUCHWITZ, OF BERLIN, GERMANY.

INDICATING AND RECORDING MECHANISM.

1,206,035.   Specification of Letters Patent.   Patented Nov. 28, 1916.

Application filed May 1, 1913, Serial No. 764,860. Renewed June 1, 1916. Serial No. 101,171.

*To all whom it may concern:*

Be it known that I, REINHOLD SCHMIDT, a subject of the German Emperor, and residing at Berlin, Germany, have invented certain new and useful Improvements in Indicating and Recording Mechanism, of which the following is a specification.

The present invention relates to a registering mechanism for cash registers, registering, stamping, adding, and indicating apparatus or calculating machines which is provided with members movable longitudinally to the registering device, which in the described apparatus are called "feelers" and whose paths of movement are obstructed before the operation of the mechanism by stops corresponding to the value to be registered. The characteristic feature of this invention is that these feelers are actuated directly from the driving mechanism of the apparatus, with the aid of compressible elastic members such as springs, between the common driving bar and the separate feelers, such that on fixing one feeler by a stop, the other feelers can be further actuated by the said plate owing to the compression of the elastic intermediate member belonging to the feeler rendered stationary. After all the feelers have been fixed and the driving motion of the apparatus has stopped the said feelers return immediately to their original position (zero position) whereupon the apparatus is ready for a fresh operation of the feelers. The consequence of such a construction of an apparatus of this sort, is that the path of driving mechanism need only be relatively very short because the motion of the said mechanism is transmitted directly by the interposed springs to the registering controlling members or feelers. The force necessary to operate the apparatus is therefore relatively small because all the springs located between the feelers and driving plate are practically never compressed simultaneously to their full extent because the registration 0.0 and so forth is hardly ever needed. The interposed springs are always in a released state when the apparatus is not being operated because the feelers return to their original position when the driving movement of the apparatus has ceased. The said springs need only be compressed so far as is necessary to bring about the registration of the particular amount or value required which is very advantageous for their maintenance and life.

The positioning of the stops for the feelers is effected from a table or scale containing the values or numbers to be registered, by means of buttons or the like, the latter on being displaced, locating the corresponding stops by means of suitable levers. The said stops are locked by a device susceptible of being released by the zero key.

The registering device is suitably symmetrically arranged on both sides of the registering levers such that by means of each key or button, according to which are actuated two symmetrically located values, numerically such as units and tens can be registered.

Figure 8:
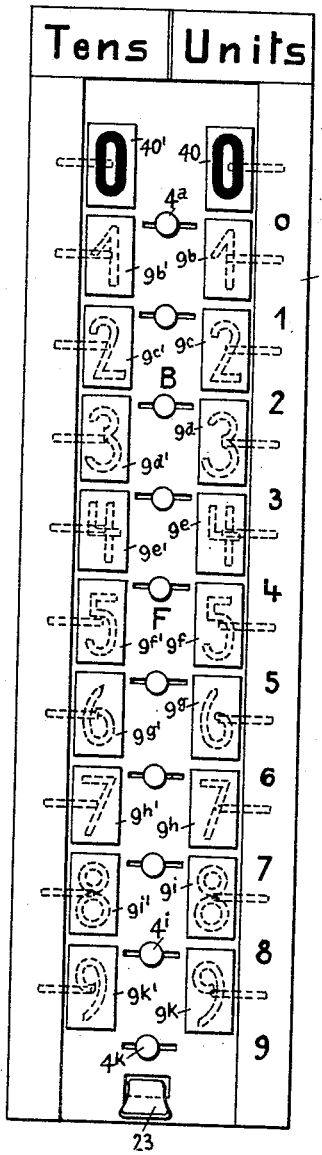
Figure 9:
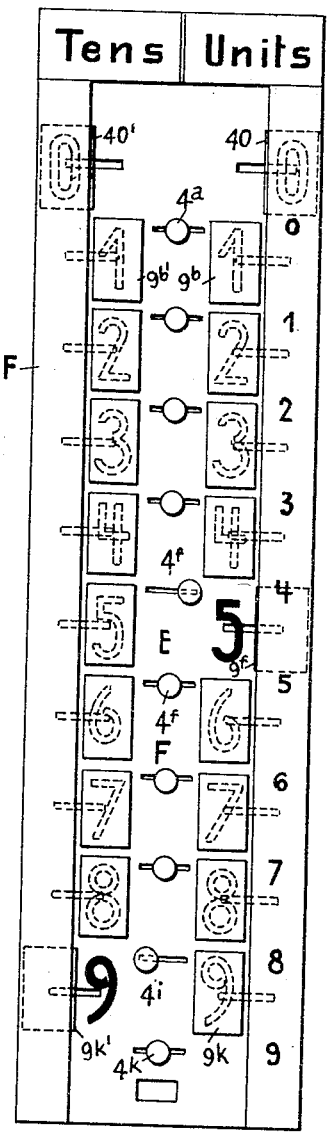
Figure 10:
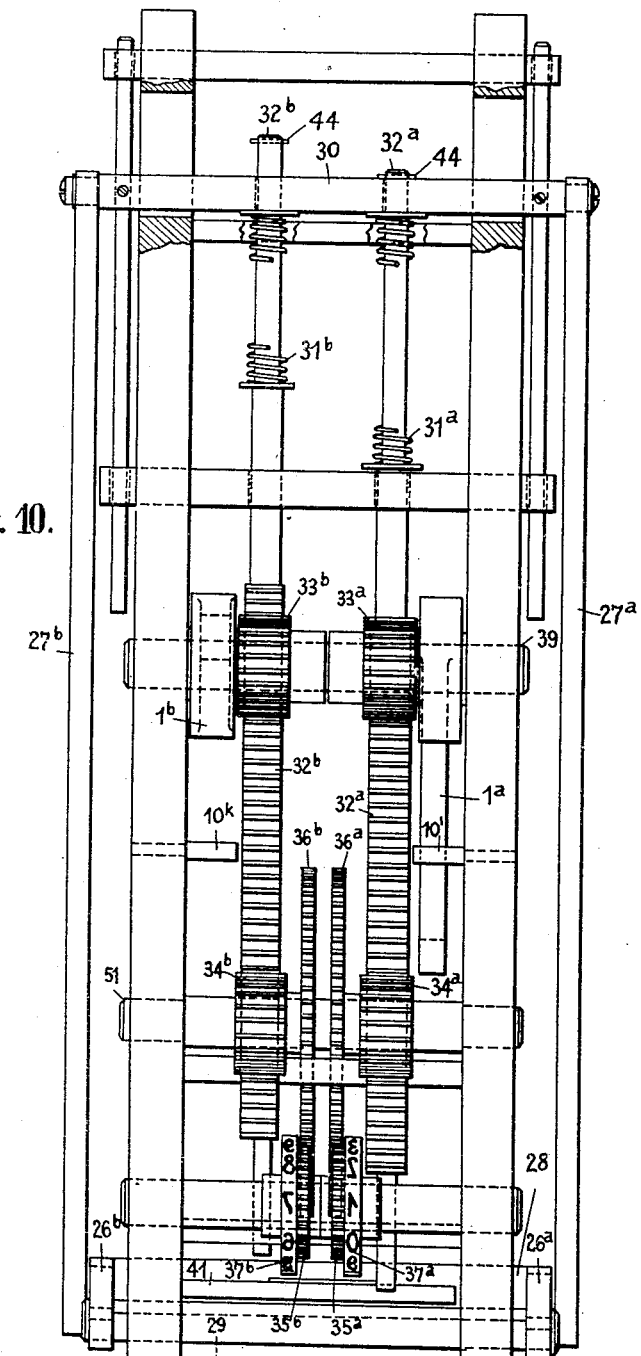

In the accompanying drawing which illustrates an embodiment of the invention by way of example:—Figures 1 and 2 are end elevations of the device, the lateral walls or plates being removed, Fig. 1 showing the device in its normal position of rest and Fig. 2 in operation; Fig. 3 is a transverse section on line III—III of Fig. 1; and Fig. 3$^a$ shows a detail, namely the releasing lever for the zero stop in plan on line III$^a$—III$^a$ of Fig. 1; Fig. 4 is a similar section to Fig. 3 on IV—IV of Fig. 2; Figs. 5, 6 and 7 show details of the registering mechanism and in particular Figs. 5 and 6 are plans of the device which releases all operated stops, that is to say replaces all the rows of stop levers in the zero position; Fig. 7 is a plan of the zero key which serves to release the stop of each separate row of stop levers and to replace them in the zero position. Fig. 8 shows the key board in its zero position and Fig. 9 shows the same with some digits registered; Fig. 10 shows the back elevation of the whole of the arrangement in the direction indicated by the arrow shown in Fig. 2 and in the position occupied by the parts as shown in that figure; the indicating device proper being removed.

In the example shown in the drawings a registering mechanism is illustrated for two rows of digits also for the registration of values up to 99 but this arrangement may be repeated in juxtaposition as often as desired in the same mechanism so that the limit of the values to be registered can be extended as far as desired.

The registering mechanism consists of the registering device proper A comprising the key board B, the driving mechanism C which actuates the feelers $1^a$, $1^b$ effecting the registration.

In the registering device A there are 10 registering or key levers $5^a$, $5^b$ . . . $5^k$ rotatably mounted on the spindle 3, these levers being superpose in the case illustrated. These levers are provided, at their outer ends, with buttons or heads $4^a$, $4^b$ . . . $4^k$ which, as shown in Figs. 1 and 2, project to different extents from the keyboard B so as to permit of readily gripping them. Each of the T-shaped levers $5^b$ to $5^k$, except the lever $5^a$ for zeroizing, is provided, at both ends of its rear cross-bar, with two pins $6^b$, $6^{b'}$, or $6^c$, $6^{c'}$ and so on up to $6^k$, $6^{k'}$ by means of which the proper stop levers $7^b$, $7^{b'}$, $7^c$, $7^{c'}$ . . . $7^k$, $7^{k'}$ can be rocked. These levers are located on both sides of and slightly above the registering lever in such a manner that they are rockable about the longitudinal axes 8 and 8'. The front end of each of the stop levers $7^b$, $7^{b'}$ . . . $7^k$, $7^{k'}$ carries a shield $9^b$, $9^{b'}$ . . . $9^k$, $9^{k'}$ which covers, when the device is in its inoperative position (see Fig. 8) the numbers 1 to 9 of the device, to be registered. If one of the levers $7^b$, $7^{b'}$ to $7^k$, $7^{k'}$ (see Fig. 4) is rocked then the corresponding digit on the keyboard B, 5 in the case of Fig. 9 is uncovered. Further each of the stop levers $7^b$ to $7^i$ and $7^{b'}$ to $7^{i'}$ is provided with a stop $10^b$ to $10^i$ and $10^{b'}$ to $10^{i'}$ which, when the respective lever is rocked, is swung to the left and to the right (see Fig. 4) and thus move into the path of movement of the feelers $1^a$ and $1^b$ as illustrated in Figs. 2 and 4 for the unit stop lever $7^{f'}$.

The rocking of the stop levers $7^b$—$7^k$ and $7^{b'}$—$7^{k'}$ is effected by the rocking of the corresponding registering levers $5^b$—$5^{k'}$ owing to the pins 6 turning the rear ends of the stop levers inwardly (see Fig. 4).

The stop levers $7^b$, $7^{b'}$ . . . are locked in the rocked position (Fig. 4) by a device consisting of two catches 11 and 11' pivoting about the axes 12, 12' and which are controlled by springs 13, 13' constantly tending to retain the catches 11, 11' in the locking position.

When one of the stop levers $7^b$, $7^{b'}$ . . . is rocked the corresponding catch 11 or 11' is pushed out from its locking position (Fig. 4) by the rear end of the respective stop lever against the action of the spring 13 or 13' but the catch returns to this position after the rear end 14 or 14' of the said lever $7^b$ or $7^{b'}$ has passed the tip of the catch 11 or 11'.

For remaining in the zero position when the device is inoperative in which position the feelers $1^a$, $1^b$ must not move notwithstanding the motion of the driving mechanism, the following device has been provided:—In the frame of the device there are two shafts 15 and 15' rotatably mounted which, at the upper and lower end, are rigidly connected to the levers 16, 16' and $16^a$, $16^{a'}$. The front ends of the superposed levers 16, $16^a$ and 16', $16^{a'}$ are connected by longitudinal rods 17 and 17' which are located parallel to the stop levers $7^b$, $7^{b'}$ . . . The shafts 15, 15' carry extensions 18, 18', at suitable height-position, which are provided with tappets 19, 19' for the zero position of the feelers $1^a$, $1^b$. When the registering mechanism is inoperative (Figs. 1, 3 and 8) then the tappets 19, 19' are in the way of the feelers $1^a$ and $1^b$ at such a height that the latter cannot effect any downward movement. However, as soon as any stop lever 7 is rocked then it outwardly carries with it the corresponding rod 17 or 17', rocks the corresponding shaft 15 or 15' and removes the tappet 19 or 19' from the path of the feeler $1^a$ or $1^b$ (Fig. 4). Hereupon the feeler referred to, can move downwardly past the tappet 19 or 19' till it is stopped by the stop on that one of stop levers $7^b$, $7^{b'}$ . . . which has been operated. The upper levers 16, 16' of the zeroizing device carry, at their front ends, two shields 40 and 40' located at the top of the keyboard B and have the ciphers "0" printed or painted thereon (Fig. 8). When the apparatus is inoperative the zero ciphers are only visible, but as soon as any of the stop levers 7 have been rocked by the corresponding registering lever 5 whereby the respective zeroizing device 15, 16, 17 is displaced, then the shields 40 or 40' carrying the cipher "0" are also rocked and guided beneath the keyboard B. (Fig. 9.)

The release of the operated stop levers $7^b$, $7^{b'}$ . . . from the locking position, is automatically effected owing to the springs 20 connecting each pair of stop levers, as soon as the catch 11 or 11' is displaced.

The displacement of the catch 11 or 11' is effected by the rocking of another stop lever of the same row owing to the fact that the rear end 14 of the lever rocked last, will as described hereinbefore, rock the catch 11 about the axis 12 to such an extent that the previously retained stop lever is now released. Besides releasing the actuated stop lever by actuating another stop lever of the same row, the release may be also effected by intermittently depressing the zero key $4^a$. When this is done the rear end of the respective lever $5^a$ which is provided as shown in Fig. 7, with extensions 21, 21' will, on rocking the lever about the shaft 3, come in contact with two extensions 22, 22' of the catches 11, 11' respectively and thus release the latter. As soon as all the stop levers $7^b$, $7^{b'}$, $7^c$, $7^{c'}$ . . . of one row resume their inoperative position, the levers 16 and 16' thus released will automatically change their positions, under the influence of the springs 49 connecting these levers, from that of Fig. 4 to that of Fig. 3 whereby the shields 40 and 40' are also caused to come in sight. However, in order to zeroize, in the case illustrated, both the rows of digits simultaneously, a universal releasing device has been provided and is shown in Figs. 5, 6 and 8. This device is located at the lower end of the key board and comprises a depressible lever 23, the rear end 24 of which has a wedge shaped upper surface such that on depressing the front end of the lever the part 24 moves upwardly and is forced between the ends of two pivoted levers 25, 25' which, with their rear ends, also bear upon two extensions $22^a$, $22^{a'}$ of the catches 11, 11', respectively. On wedging in the wedge 24 both catches 11, 11' are released in the manner shown in Fig. 6 and release the hitherto retained stop levers $7^b$, $7^{b'}$. The release key 23 resumes its original position under the influence of the springs 13, 13' and similarly the zero tappets 19, 19' resume their original position owing to the spring 49 connecting the levers 16 and 16' and in which the said tappets are in the way of the feelers $1^a$ and $1^b$. Since the return of the stops for the digits 9 in the out position is never required as the feelers $1^a$, $1^b$ need never be moved beyond the stop for the number 9, then the stops $10^k$, $10^{k'}$ can as shown, be firmly fixed in the frame of the device and therefore are not located on the stop levers $7^k$, $7^{k'}$ (Figs. 1 to 4).

The driving mechanism of the feelers $1^a$, $1^b$ which in the illustrated case, are rigidly connected with the toothed wheel $33^a$, $33^b$, respectively and which are loosely rotatable on a shaft 39 located in the frame of the device, consists of two toothed racks $32^a$, $32^b$ actuated by levers. The levers comprise the two levers $26^a$, $26^b$ pivoting about the axis 28 and which are provided at their front ends, with knob 29 and on being depressed actuate two draw-bars $27^a$, $27^b$ provided, in turn, at their upper end, with a transverse bar 30 which transmits the movement of the draw-bars to the racks $32^a$, $32^b$. This transverse bar, which is horizontally located in the frame of the device, rests upon the springs $31^a$, $31^b$, the lower ends of which contact with extensions of the racks $32^a$, $32^b$.

The racks actuate, besides the driving gears $33^a$, $33^b$ of the feelers $1^a$ and $1^b$, the two lower gears $34^a$, $34^b$ loosely mounted on the axis 51, and which are rigidly connected with two larger gears $36^a$, $36^b$ respectively. The latter gears are, in turn, connected with the driving gears $35^a$, $35^b$ of the type-carrying wheels $37^a$, $37^b$ (Figs. 1, 2 and 10). The downward movements of the racks $32^a$, $32^b$ are independent of each other, notwithstanding the common transverse bar 30, so that, for example, if the feeler $1^b$ comes in contact with a stop 10 of the locking device and the rack $32^b$ is thus locked also, then the rack $32^a$ will still be capable of continuing its downward motion as the spring $31^b$ is susceptible of being compressed during the further motion of the bar 30 (see Fig. 10).

As the position of the type-carrying wheels $37^a$, $37^b$ depends upon the extent of the downward movement of the racks $32^a$, $32^b$, it is evident that according to the stops which are placed in the way of the feelers $1^a$, $1^b$, corresponding types on the wheels $37^a$, $37^b$ will be set in position for impression. Having carried out this, the impression can be effected either by the upward movement of impression plate 41 (Figs. 1, 2 and 10). After the impression, first the impression device (plate 41) and then the levers 26, 27, 30 under the influence of the interposed springs 43, and the racks $32^a$, $32^b$ actuated by the pins 44 and the type-wheels resume automatically their original position as illustrated in Fig. 1.

The operation of the registering device will be further explained by means of a numerical example. Should it be required to register the value 95, as shown in Fig. 9, then, first of all, the key $4^f$ is slightly turned to the right whereby the stop lever $7^f$, according to Fig. 4, is rocked outwardly to the right by the registering lever $5^f$ and is retained in that position by the catch 11. The stop $10^f$ on the stop lever $7^f$ is then in the way of the feeler $1^b$ pivoting about the shaft 39. Owing to the multiplication of motion effected by the registering levers, the movement of the key $4^f$ need only be very small. Simultaneously with the positioning of the stop $10^f$, the shield $9^f$ is removed from the digit 5 so that the latter appears on the scale. A further consequence of the movement of the stop lever $7^f$ is that simultaneously the zero stop 19 is removed from the path of the feeler $1^b$ by the rod 17. When this tappet moves, the shield 40 carrying the cipher 0 (see Fig. 9) disappears.

After the registration of the digit 5 the digit 9 is registered in a corresponding manner and similarly the zero tappet 19' is moved out. Subsequently by rocking the levers $26^a$, $26^b$ by means of the knob 29 the transverse bar 30 is moved downwardly by links $27^a$ and $27^b$ and by means of the spring $31^b$ moves the rack $32^b$ until the feeler $1^b$ comes in contact with the tappet $10^f$ (see Figs. 2 and 10) at which moment the type wheel $37^b$ is set for the digit. The plate 30 and the rack $32^a$ continue their downward motion, compressing the spring $31^b$. The motion of the rack $32^a$ ceases only then when the feeler $1^a$ comes in contact with "nine" stop $10^k$ and the type wheel $37^a$ is then set for the digit 9. In order to set a number whose two digits are the same, as 55, the lever $4^f$ is first moved to the position indicated in Fig. 9, to indicate the units digit, or 5, and is then moved to the extreme left to indicate the tens digit or 50. After the type wheels 37$^b$ and 37$^a$ have been set for the impression of the registered value 95, the printing can be effected by upward movements of the impression plate 41. After the impression, first the impression device (plate 41) and then the racks 32$^b$, 32$^a$ carried upwardly by the transverse bar 30 owing to the pins 44 and the feelers 1$^b$, 1$^a$ and the type wheels 37$^b$, 37$^a$ resume automatically their original positions under the influence of the springs 43. If the registering device A is left in an operated position and the levers 26$^a$, 26$^b$ again depressed then another impression of 95 will be obtained. However, should another number, say 37, be registered then it is only necessary to turn the key 4$^h$ to the right and the key 4$^d$ to the left, whereby the "one" stop 10$^h$ and the "ten" stop 10$^{d'}$ are brought in the way of the feelers 1$^b$ and 1$^a$, respectively, in the manner described hereinbefore. If it is desired to cause the registering mechanism to resume its original position (Fig. 9) then it is sufficient to depress the key 23 whereby the catches 11, 11' are rocked outwardly and the stop levers 7 retained by them, are now released. However, if it is desired to cause only one row, say the units, to resume its original position, then it suffices to move the zero key 4$^a$ to the right whereby the catch 11 is released on the right. Subsequently, if the apparatus were in the previous position according to Fig. 9, the registration and impression of the value 90 would be obtained. The possibility of causing the separate rows to resume their original positions is also of great importance in the case it is desired to eliminate any mistakes which may have occurred during the operation of the keys as it suffices to zeroize only that row in which the mistake was made.

What I claim as my invention and desire to secure by Letters Patent of the United States is:—

1. In a machine as described, a plurality of digit wheels, a swinging feeler for each of the latter to control the extent of movement of each wheel, a stop for each digit of said wheels independently movable into the path of the feelers to determine the extent of movement of the latter, an actuating member for each feeler, means to move said members simultaneously, and a yielding connection between the actuating members and their moving means, whereby when one feeler and its actuating member is limited by a stop said moving means can continue its movement to further move the other feeler and its actuating means.

2. In a machine as described, the combination with a plurality of rows of indicator levers, stops on said levers, feeler levers movable in the paths of said stops, a catch for holding the indicator levers in operative position, an actuating lever common to a plurality of indicator levers of different digits, recording wheels, and means common to the recording wheels of a plurality of digits for actuating them.

3. In a machine as described, a set of indicator carrying levers for each digits column, actuating levers common to like digit indicator carrying levers of different digit columns, to actuate said indicator carrying levers, and a catch for each of the latter, all of the catches of a digit column being simultaneously movable on a single axis.

4. In a machine as described, a set of indicating levers for each digits column, a shield on each lever, a screen behind which said shields are moved when said levers are actuated, a casing through which said levers project, the shield of the zero digit having zero thereon, all the other shields being blank and covering their respective numbers when in inoperative position, means connected to the zero-indicating lever and in the path of movement of all the other levers, whereby the zero lever will be actuated by any other digit lever and simultaneously cause the zero-indication to disappear and the numeral to become exposed.

5. In a machine as described, a set of indicating levers for each digits column, a shield on each lever, a screen common to all the shields of a column, a key lever for each digit of the column of digits, the zero key lever when moved to zero position operating to cause the return of any digit of the column to inoperative position, and means on said zero indicator lever actuated by any one of the other digits indicator levers of the column to move said zero lever to non-indicating position.

6. In a machine as described, the combination with indicator levers arranged in parallel digits columns, springs connecting like levers of adjacent columns, a key lever common to the levers of a pair, spring-urged catches for the indicator levers, all the catches for the indicator levers of a column being movable in unison.

7. In a machine as described in combination, indicator levers arranged in digits columns, springs connecting like digit levers of adjacent columns to draw them together, spring-urged catches for each column of levers and movable in unison, a zero indicating lever, means actuated by any one of the number digit levers to simultaneously actuate the zero indicator lever, a single clearing key and lever mechanism between said key and latches of the columns to simultaneously actuate them.

8. Registering mechanism comprising in combination a recording device, a movable member for each set of numbers, a series of stops adapted to be moved into the path of the said member and limit its movement to varying amounts, a row of registering levers rotatably mounted on an axis, means operated by said registering levers for moving the said stops, a single controlling member for operating the said movable members, elastic compressible members between said controlling and movable members, and means for operating the said recording device by means of said movable member.

9. In an indicating recorder, a recording device, two movable members, a row of key registering levers rotatably mounted on an axis, a plurality of rows of stop levers pivoted on axes parallel to the axes of the key levers, by which they are operated, and carrying stops for said members, a single controlling member for operating the said movable members, elastic compressible members between said controlling and moving members, and means for operating the said recording device by means of said movable members.

10. Registering mechanism, comprising in combination, a recording device, movable members for each set of numbers, a series of stops adapted to be moved into the path of the said members and limit their movement to varying amounts, key levers rotatably mounted, a plurality of rows of stop levers pivoted on axes parallel to the axes of the key levers and carrying the said stops, means for moving said stop levers by the said key levers, means for holding said stop levers in operative position, a single controlling member for operating the said movable members, elastic compressible members between said controlling and moving members, and means for operating the said recording device by means of said movable members.

In testimony whereof, I affix my signature in the presence of two witnesses.

REINHOLD SCHMIDT.

Witnesses:
WOLDEMAR HAUPT,
HENRY HASPER.

Copies of this patent may be obtained for five cents each, by addressing the "Commissioner of Patents, Washington, D. C."